United States Patent [19]

Mamish

[11] Patent Number: 5,246,773

[45] Date of Patent: * Sep. 21, 1993

[54] INDUSTRIAL TAPES

[75] Inventor: Abboud L. Mamish, Natick, Mass.

[73] Assignee: The Kendall Company, Mansfield, Mass.

[*] Notice: The portion of the term of this patent subsequent to Jul. 13, 2010 has been disclaimed.

[21] Appl. No.: 730,732

[22] Filed: Jul. 16, 1991

Related U.S. Application Data

[63] Continuation of Ser. No. 325,822, Mar. 20, 1989, abandoned.

[51] Int. Cl.$^5$ .............................................. C09J 7/04
[52] U.S. Cl. .................................. 428/286; 428/353; 428/354
[58] Field of Search ............... 428/343, 353, 354, 261, 428/286

[56] References Cited

U.S. PATENT DOCUMENTS

| | | | |
|---|---|---|---|
| 4,059,715 | 11/1977 | Pletcher | 428/349 |
| 4,183,995 | 1/1980 | Marshall | 428/354 |
| 4,248,918 | 2/1981 | Hornibrook | 428/40 |
| 4,292,360 | 9/1981 | Riedel | 428/354 |
| 4,705,715 | 11/1987 | DeCoste | 428/354 |
| 4,759,983 | 7/1988 | Knutson | 428/343 |
| 4,772,499 | 9/1988 | Greenway | 428/354 |
| 5,108,815 | 4/1992 | Adams | 428/213 |

Primary Examiner—Jenna L. Davis
Attorney, Agent, or Firm—Alvin Isaacs

[57] ABSTRACT

Novel finger-tearable industrial tapes comprising:
(1) a lightweight nonwoven synthetic cloth;
(2) a polymeric backing layer from about 3 to about 5 mils thick bonded to one surface of said cloth with additional amounts of said polymeric backing material at least partially filling the voids or interstices within said cloth, at least the free outer surface of said backing layer comprising a polyolefinic material; and
(3) a layer of a pressure-sensitive adhesive material at least 1.0 mils thick bonded to the opposed surface of said cloth with a portion of the adhesive material on the inner surface of the adhesive layer laminated to the polymeric material of said backing layer within the interstices of said cloth, thereby forming a unitary laminar structure in which the nonwoven cloth is characterized as being sandwiched between the respective polymeric backing layer and adhesive layer materials.

6 Claims, No Drawings

INDUSTRIAL TAPES

This application is a continuation of application Ser. No. 325,822, filed Mar. 20, 1989, now abandoned.

BACKGROUND OF THE INVENTION

Industrial tapes utilizing a cloth material for additional strength are well known in the art. Where generally even tearing in the crossdirection is desired, i.e. tapes that are referred to in the art as being "finger-tearable", a woven cloth material is employed, since nonwovens as a class are characterized as possessing poor crossdirectional tear characteristics.

Yet, from the standpoint of cost-effectiveness, it remains desirable to provide industrial tapes which are substantially evenly tearable in the crossdirection utilizing nonwovens for additional strength in lieu of wovens.

A primary object of this invention is to provide cost-effective finger-tearable industrial tapes employing nonwoven cloths, which tapes find particular utility in the automotive industry.

Other objects of the invention will be apparent from the following detailed description.

BRIEF DESCRIPTION OF THE INVENTION

In accordance with this invention, the aforementioned objective is accomplished by providing a pressure-sensitive adhesive tape comprising:
(1) a lightweight nonwoven synthetic cloth;
(2) a polymeric backing layer from about 3 to about 5 mils thick bonded to one surface of the cloth with additional amounts of the polymeric material at least partially filling the interstices of the cloth, at least the outer surface of the backing layer comprising a polyolefinic material; and
(3) a layer at least about 1.5 mils thick of a pressure-sensitive adhesive material bonded to the opposed surface of the cloth with a portion of the adhesive material on the inner surface of the adhesive layer being laminated to polymeric material of said backing layer within the interstices of the cloth, thereby forming a unitary laminar structure in which the nonwoven cloth is characterized as being sandwiched between the polymeric backing material on one surface thereof and the adhesive material on the opposed surface thereof.

DETAILED DESCRIPTION OF THE INVENTION

As was previously mentioned, the present invention is directed to an industrial tape wherein a nonwoven cloth material is sandwiched between a polymeric backing layer on one side and a pressure-sensitive adhesive layer on the other, at least the outer surface of the backing layer comprising a polyolefinic material. The nonwoven cloth is not present as a discrete layer. Rather, the backing layer material both coats and invades the interstices of the cloth, so that the cloth may be said to be "embedded" in the backing layer material as well as being chemically bonded or laminated thereto. The adhesive layer on the opposed surface is also chemically bonded to the cloth with a portion of the adhesive material being laminated to the polymeric material within the interstices of the cloth to provide a unitary laminar structure. The polymeric material coating and filling the interstices of the cloth restrict the movement of the nonwoven fibers so that they will tear substantially evenly only in the direction where the tearing force is exerted. Thus, although a nonwoven by definition is oriented in all directions, if the tearing force is exerted in the crossdirection, it will tear substantially evenly in this direction.

At least the outer surface of the backing layer comprises a polyolefinic material. The entire backing layer may comprise a polyolefinic material. Alternatively, if found desirable or expedient to do so, the backing layer(s) may be a multi-layered structure with the outer layer being laminated to the cloth through an intermediate tiecoat layer.

In either instance, the backing layer may be described as being multi-functional in the sense that it acts as a sealant to the discontinuous nonwoven surface; serves as a barrier against adhesive migration; provides ease of unwind from a roll of the tape, thereby eliminating the need for a release agent treatment; and, moreover, acts as a reinforcement to the nonwoven cloth which initially is characterized as possessing poor crossdirectional tear characteristics and tensile strength.

In theory, any of the polyolefinic materials heretofore employed in the art as backing layers for adhesive tapes may be employed in the practice of this invention. As examples of such materials, mention may be made of the polyethylenes, e.g. low density (LDPE), high density (HDPE), very low or ultra low density (VLDPE), and linear low density (LLDPE) polyethylene. Other useful polyolefins which may be used alone or in combination, e.g. with polyethylene, include ethylene vinyl acetate copolymers, ethylene propylene rubber, EPDM, polypropylene, polyvinyl chloride, polyisobutylene, conjugated diene butyl, etc.

The backing layer may be what is termed as two-layer polyolefinic backing consisting essentially of an outer layer of HDPE and an inner layer of LDPE. In such an embodiment, the two-layer backing may be formed by coextrusion coating it onto the nonwoven cloth. The ratio of thickness of the HDPE and LDPE in this two-layer backing will preferably be on the order of from about 7:8 to about 8:1.

An important aspect of this embodiment of the invention is the improved tensile strength obtainable by employing the two-layer HDPE/LDPE backing layer over LDPE alone. While LDPE is more cost-effective and conformable than HDPE, replacing some of the thickness of the backing layer with HDPE has been found to provide the requisite tensile strength for the contemplated masking tape which is not obtainable by employing LDPE alone.

Where a tie coat is employed as the inner stratum of the backing layer to increase adhesion, any of the per se known materials providing a good chemical bond to both the polyolefinic backing material on one surface and the cloth/adhesive substrate on the other may be employed. Accordingly, the selection of the particular tie coat to be used is well within the expected judgment of the skilled worker and the selection per se comprises no part of this invention.

By way of illustration, the tie coat may comprise a polyethylene copolymer such as ethylene methyl acrylate (EMA), ethylene vinyl acetate, ethylene acrylic acid, etc., EMA being preferred. In any event, if a tie coat is employed, it should be a thin layer, preferably on the order of 0.25 to 1.0 mils thick.

The nonwoven cloth to be employed will preferably be any of the synthetic nonwovens theretofore known in the art. Suitable synthetic fibers include the rayon, polyesters, polyamides, acrylics, etc. As is known, the fibers may first be carded to orient them primarily in the machine direction. The carded fibers may then be subjected to scrambling, after which they may be chemically or thermally bonded, or hydroentangled to produce the nonwoven fabric, all in per se known manner in the art.

Preferably, however, the nonwoven will be chemically bonded, i.e. the fiber web will be contracted with one or more of the known bonding agents in known manner such as by impregnation, printing, etc. Useful binders for this purpose include acrylics, vinyl acrylics, acetate/ethylene, polyvinyl acetate, polyesters, etc.

The adhesives employed to prepare the novel masking tapes of this invention may be any of those heretofore employed in the art for preparing masking tapes, the selection of which per se comprises no part of this invention. It may, for example, be any of the per se known and commercially available rubber-based or acrylic pressure sensitive adhesives. The list of useful "hotmelt" adhesives, which adhesives are characterized as being novolatile adhesives made of synthetic resins and plasticizers and applied to the backing hot in the molten state. As those skilled in the art will appreciate, the adhesive should be sufficiently aggressive to adhere well to the contemplated substrates, e.g. glass, metal, plastic, etc., but should also be characterized as having good unwind from the adhesive tape roll and no discernible adhesion stick after removal.

By way of illustration, suitable adhesives of this general description include rubbery block copolymers containing a polyisoprene midblock such as are disclosed in U.S. Pat. No. 4,699,941 or the hotmelt adhesives disclosed, for example, in U.S. Pat. Nos. 4,623,698; 4,636,555; 4,669,163; 4,698,242; 4,698,405 or 4,717,749.

In any event, the selected adhesive will be applied in a layer at least 1.0 mils thick.

The manner of applying the adhesive to the nonwoven cloth also is not critical to the practice of this invention. Preferably, it is applied by using a hot melt applicator. However, other modes of application such as solvent coating, extrusion coating, and the like may also be employed.

In like manner, the method of applying the backing layer to the cloth is not critical. However, extrusion coating is preferred. When the backing layer is composed of two or more strate, as previously discussed, a particular efficacious way of doing so is by coextrusion utilizing per se known coextrusion techniques.

In general, such known coextrusion techniques employ two or more extruders, each delivering a single component polymer melt (in this case HDPE/LDPE) to a combining feedblock which streamlines, combines and feeds the polymers to a single- or multimanifold coat hanger die which in turn feeds the two-layered film into a roll/nip where the cloth web is fed simultaneously at that point to form the backing layer/nonwoven laminate. Standard single screw extruders may be employed to melt and pump the individual layers into the coextrusion feedblock or die, as the case may be. High extrusion temperature profiles, e.g. 500°-600° F., are advisable in this stage as well as in the feedblock and die stages. These high temperatures will improve the bonding mechanism of the coextruded layers to the cloth.

Preferably, the feed pipes connecting the extruders to the feedblock should be kept to the shortest length possible to avoid long residence time which may result in polymer degradation as well as high pressure drop that could cause melt surges.

The dies employed in the extrusion coating applications typically consist of a single- or multimanifold coat hanger design with a tear drop cross section and narrow land length. This design facilitates better control over the thin film thicknesses through gradual and continuous build up of head pressure.

Since the coextrusion techniques, as described briefly above, are well known in the art, such details as barrel and die temperatures, screwspeeds and the like will be well understood and a further detailed description is not necessary for a clear understanding of the invention.

The following Examples show by way of illustration and not by way of limitation the practice of this invention.

EXAMPLE 1

A mixture of 95% LDPE and 5% of a 50/50 blend of a color pigment and LDPE (total contents: 97.5% by weight LDPE and 2.5% by weight pigment); and a mixture of 95% HDPE and 5% of a 50/50 blend of color pigment and HDPE (total contents 97.5% HDPE and 2.5% pigment) are coextruded onto a rayon/polyester blend nonwoven cloth weighing 17 grams per square yard to provide a two-layer backing wherein the outer layer was a 2.5 mil thick HDPE layer and the inner layer bonded to the cloth was a 1.4 mil LDPE layer. The processing conditions for the extrusion coating are as follows:

|  | Extruder 1 | Extruder 2 |
|---|---|---|
| Temp., barrel zone 1 | 350° F. | 350° F. |
| Temp., barrel zone 2 | 450° F. | 450° F. |
| Temp., barrel zones 3, 4, 5 | 550° F. | 550° F. |
| Temp., Adapter | 550° F. | 550° F. |
| Temp., Die zones 1-5 | 550° F. | 550° F. |
| Melt temp. | 550° F. | 550° F. |
| RPM | 87 | 51 |
| Head Pressure (psi) | 1100 | 1200 |
| Output (psi) | 87 | 255 |
| Line speed (ft/min) | 225 | — |
| Nip roll pressur (psi) | 40 | — |

A styrene/isoprene block copolymer hot melt pressure sensitive adhesive (pale yellow color; softening point (Ring & Ball), 223°-233° F.; application temperature, 300°-330° F.; specific gravity, 0.93-0.97; solids content, 100%) is then applied to the opposed surface of the cloth by slot die coating using a hot melt applicator at a temperature of about 300° F. to provide an adhesive coating weighing about 40 grams per square yard, the costing being about two mils thick.

EXAMPLE 2

A mixture of 95% LDPE and 5% of a 50/50 blend of pigment and LDPE is extruded onto the nonwoven cloth as described in Example 1 to provide a backing of LDPE approximately 4 mils thick. A rubber-based adhesive is then calendered onto the opposite surface to provide an adhesive layer approximately 2.5 mils thick.

EXAMPLE 3

Example 2 is repeated, except that the LDPE and EMA are coextruded to provide an EMA tiecoat layer approximately 0.50 mils thick and an outer LDPE layer approximately 3.75 mils thick.

Since certain changes may be made without departing from the scope of the invention herein involved, it is intended that all matter described in the foregoing description, including the examples, shall be interpreted as illustrative and not in a limiting sense.

What is claimed is:

1. A cloth pressure-sensitive adhesive tape characterized as being tearable with the fingers substantially evenly in the cross direction, the tape consisting essentially of:
    (1) a light weight non-woven cloth having voids or interstices;
    (2) a polymeric material backing layer from about three to about five mils thick bonded to one surface of the cloth with additional amounts of the polymeric backing material at least partially filling the voids or interstices within the cloth, the backing layer comprising an outer stratum of high density polyethylene and an inner stratum of low density polyethylene or a tie coat for increasing adhesion of the backing layer to the cloth material; and
    (3) a layer of a pressure-sensitive adhesive material at least 1.0 mils thick bonded to the opposed surface of said cloth with a portion of the adhesive material on the inner surface of the adhesive layer laminated to the polymeric material of the backing layer within the interstices of said cloth, thereby forming a unitary laminar structure in which the nonwoven cloth is characterized as being sandwiched between the respective polymeric backing layer and adhesive layer materials.

2. An adhesive tape as defined in claim 1 wherein the inner stratum of the backing layer is a low density polyethylene.

3. An adhesive tape as defined in claim 1 wherein the inner stratum of the backing layer is a tie coat.

4. An adhesive tape as defined in claim 3 wherein the tie coat comprises an ethylene methyl acrylate copolymer.

5. An adhesive tape as defined in claim 1 wherein the non-woven cloth comprises synthetic fibers.

6. An adhesive tape as defined in claim 5 wherein the synthetic fibers are chemically bonded to form the non-woven cloth.

* * * * *